(12) United States Patent
Torres (10) Patent No.: US 7,272,610 B2
(45) Date of Patent: Sep. 18, 2007

(54) KNOWLEDGE MANAGEMENT SYSTEM

(75) Inventor: Jose Torres, Katy, TX (US)

(73) Assignee: Medrecon, Ltd., Bellaire, TX (US)

( * ) Notice: Subject to any disclaimer, the term of this patent is extended or adjusted under 35 U.S.C. 154(b) by 268 days.

(21) Appl. No.: 10/287,613

(22) Filed: Nov. 4, 2002

(65) Prior Publication Data

US 2004/0088313 A1 May 6, 2004

Related U.S. Application Data

(60) Provisional application No. 60/335,541, filed on Nov. 2, 2001.

(51) Int. Cl.
G06F 17/30 (2006.01)
(52) U.S. Cl. ................ 707/101; 707/3; 707/102; 715/512; 715/513
(58) Field of Classification Search ................ 707/3, 707/10, 101, 102, 2, 7; 704/273; 715/511, 715/512, 513
See application file for complete search history.

(56) References Cited

U.S. PATENT DOCUMENTS

| 5,842,218 | A |   | 11/1998 | Robinson ................. 707/102 |
| 5,852,821 | A | * | 12/1998 | Chen et al. ................. 707/2 |
| 5,875,446 | A |   | 2/1999  | Brown et al. ............... 707/3 |
| 5,970,490 | A |   | 10/1999 | Morgenstern .............. 707/10 |
| 6,029,195 | A |   | 2/2000  | Herz ........................ 709/373 |
| 6,094,649 | A |   | 7/2000  | Bowen et al. .............. 707/3 |
| 6,182,067 | B1 |   | 1/2001  | Presnell et al. ............. 707/5 |
| 6,314,425 | B1 | * | 11/2001 | Serbinis et al. ........... 707/10 |
| 6,341,290 | B1 | * | 1/2002  | Lombardo et al. ..... 707/104.1 |
| 6,356,893 | B1 | * | 3/2002  | Itakura et al. .............. 707/3 |
| 6,366,910 | B1 |   | 4/2002  | Rajaraman et al. ........ 707/5 |
| 6,401,066 | B1 | * | 6/2002  | McIntosh ................. 704/273 |
| 6,493,702 | B1 | * | 12/2002 | Adar et al. ................. 707/3 |
| 6,549,922 | B1 | * | 4/2003  | Srivastava et al. ...... 707/205 |
| 6,584,466 | B1 | * | 6/2003  | Serbinis et al. ........... 707/10 |
| 6,671,693 | B1 | * | 12/2003 | Marpe et al. ............ 707/102 |
| 6,714,964 | B1 | * | 3/2004  | Stewart et al. .......... 709/203 |
| 6,732,090 | B2 | * | 5/2004  | Shanahan et al. ......... 707/3 |
| 6,820,075 | B2 | * | 11/2004 | Shanahan et al. ......... 707/3 |
| 6,928,425 | B2 | * | 8/2005  | Grefenstette et al. ...... 707/2 |

\* cited by examiner

*Primary Examiner*—Shahid Al Alam
(74) *Attorney, Agent, or Firm*—Wong, Cabello, Lutsch, Rutherford & Brucculeri, LLP (57) ABSTRACT

The method and system of the present invention provides for a knowledge management and archival system on a network. A document to be archived is prepared as a machine readable and loaded to a database. The document can be text, image, video or audio, all of which are indexed during and/or after uploading, and stored to the database. This knowledge management system for comprises a server for uploading a record, a user terminal for creating a plurality of indices for each uploaded record; and, a search engine for locating records in response to an index sensitive inquiry. The knowledge management system can also include indexes, such as a field index, a native index and a content index. The knowledge management system also comprises an application program comprising a system administration utility, a data loading component and database management utilities.

19 Claims, 6 Drawing Sheets

KNOWLEDGE MANAGEMENT SYSTEM

CROSS REFERENCES TO RELATED APPLICATIONS

This application takes priority from Provisional U.S. Patent Application Ser. No. 60/335,541 filed on Nov. 2, 2001.

FIELD OF THE INVENTION

This invention relates to the field of document and information storage and, more particularly, to a method for storing, organizing and accessing knowledge and documents using a computer based indexed system with access control.

BACKGROUND OF THE INVENTION

Large volumes of paperwork are generated and used on a daily basis. For example, during the course of a typical court case many thousands of documents may be produced. Various businesses produce many documents in the normal course of their activities. The documents may be paper or computer documents, and may be text or images stored as audio, video, text or any combination. Storing, managing, and retrieving information from many disparate sources is a formidable task for many organizations. Problems such as misfiling or overlooking or poorly indexing documents may result in the effective loss of important information. Organizations devote considerable resources attempting to organize information in paper form in a logical way, yet still may be unable to find important documents when necessary.

Even if a database of knowledge is well organized, it may be difficult to access years later. For example, once a lawsuit or other project has concluded, documents and related information are typically stored in a long-term storage facility that may be difficult to access. A poor storage medium inhibits document access in later projects, even though documents are initially well-organized and indexed relative to an earlier time. Consequently, the knowledge may effectively be lost or may even have to be recreated at additional cost.

Many current records management systems, particularly those that manage documents in paper form, may be expensive and have narrow capabilities, particularly if they are organized using a restrictive storage system and/or indexing method.

In addition to records management and organizational problems, document authentication requirements may present additional difficulties. A considerable amount of time and money can be spent supporting a document validation system.

Some Knowledge or Document Management Systems are directed exclusively toward internal and restricted document management. Document management software allows users or user groups to check-in and check-out documents while tracking changes. This system provides an internal document processing and control system for a single enterprise that may not be amenable to multiple use and access. Some of these systems offer an Intranet solution for internal company document management. This is often an extension of a network client/server based computing system as customers start using 'Intranets' as the medium to share and use their resources. Since these companies require secure authentication by a user, the system cannot be used by those external to the system and thus document collaboration is only accomplished in a highly restricted environment.

Known systems presently in use for document management provide narrowly tailored applications for specific tasks, but lack flexibility and capability to provide a fully integrated solution for all documents to enable an organization or project to use and reuse documents. Thus, there is a need for a robust document management system with flexibilities and capabilities for multiple types of indexing, shared document accessing, access and security controls, access and use auditing/tracking, document verification, archiving and electronic filing.

SUMMARY OF THE INVENTION

The method and system of the present invention provides for a knowledge management system (KMS) on a network. A document to be archived is prepared as a machine readable document for uploading to the database. A document is a collection of data, knowledge or information which may be on any media that is machine readable or capable of being converted to machine readable information and loaded to a database. The document can be text, image, video or audio, any of which may be converted to another format, all of which are indexed during and after uploading, and stored by the Knowledge Management System (KMS) to the database.

A multilevel indexing component is provided to enable data organization and retrieval. Multiple levels of indexing occur automatically as documents are uploaded to a database. Users can determine indexes or predetermine indexes to apply to documents for uploading. A user uploading a document assigns desired attributes (or index fields) that become associated with the document and may be used to search for the document and its contents subsequently, and to determine statistics and attributes of the documents and data within the documents. Screen capture or document area highlighting, using a browser, can be used to designate and populate index fields. Various indexing tasks are done automatically during upload (and later when documents/files are accessed), other indexing tasks are undertaken by users both during upload and later access and use.

The indexes update dynamically in the database and can be used to dynamically generate data population statistics derived from the database, herein termed 'aggregated functions.' A manual or automatic history or trend analysis is generated as documents are uploaded to the database application. In this way, the indexes become tools for generating trend analysis data. The content indexing capability can be enabled for any document as well as for documents to which Optical Character Recognition or another data reformatting facility has been applied.

Sophisticated searching and compilation is provided by relating multiple indexes across a database. A multi-level search can be undertaken by a range search over a first index and used to produce a search result including data and documents of other index values that are related to the first index. This includes an indexing utility where information is automatically indexed and that results in a virtual ongoing search.

A security structure is integrated with the database for access control and monitoring. The security structure is provided for user authentication and user access to documents and database information. This structure is coupled to document verification, authentication and access controls. Access controls may be partial or total and may be based on user and document attribute profiles. Access controls may be applied with any level of indexing, including document content. Security arrangements for documents can allow for indexed parameters to launch a specific browser that has redaction enabled to allow only specific information to be viewed. All users interaction can be logged and archived. All database and document changes are tracked and archived with the capability of undoing any changes.

Database search facilities are based on a parent-to-child relation or multi-level indexes created during and after documents have been uploaded. Search restrictions are based on the security structure and are used to restrict user access to documents, portions of documents, indexes or portions of indexes. Portions of documents may be automatically redacted or highlighted by software 'blackout' overlays or equivalent processes based on the access privileges of the user.

The present invention provides for a to-do list is a list of actions for which the user may apply to a document or document index to be archived. Herein, this facility is termed a 'workflow.' These workflow instructions are for archiving and/or data and document use in project. A list of action items associated with data are generated and shared over the system. In association with the workflow facility, an 'autoinform' facility can be included to automatically inform other users when documents arrive, are completed, are available for use, or are being used.

BRIEF DESCRIPTION OF THE DRAWINGS

The present invention and its advantages will be better understood by referring to the following detailed description and the attached drawings in which.

While the invention will be described in connection with preferred embodiments, it will be understood that the invention is not limited thereto. On the contrary, it is intended to cover all alternatives, modifications, and equivalents which may be included within the spirit and scope of the invention, as defined by the appended claims.

DETAILED DESCRIPTION OF THE PREFERRED EMBODIMENTS

The present invention provides a Knowledge Management System method and apparatus that enables increased flexibility for knowledge and document management and archiving, and for organization of information in and related to databases. The present invention provides for project management and document management and information access and control across the Internet or an intranet with online project and document security controls, variable levels of indexing, remote secure document archiving, application tracking and auditing. Other features and advantages of the invention will be readily apparent to persons skilled in the art based on the following detailed description. To the extent that the following detailed description is specific to particular embodiments or particular uses of the invention, these embodiments intended to be illustrative and are not to be construed as limiting the scope of the invention.

Figure 1A:
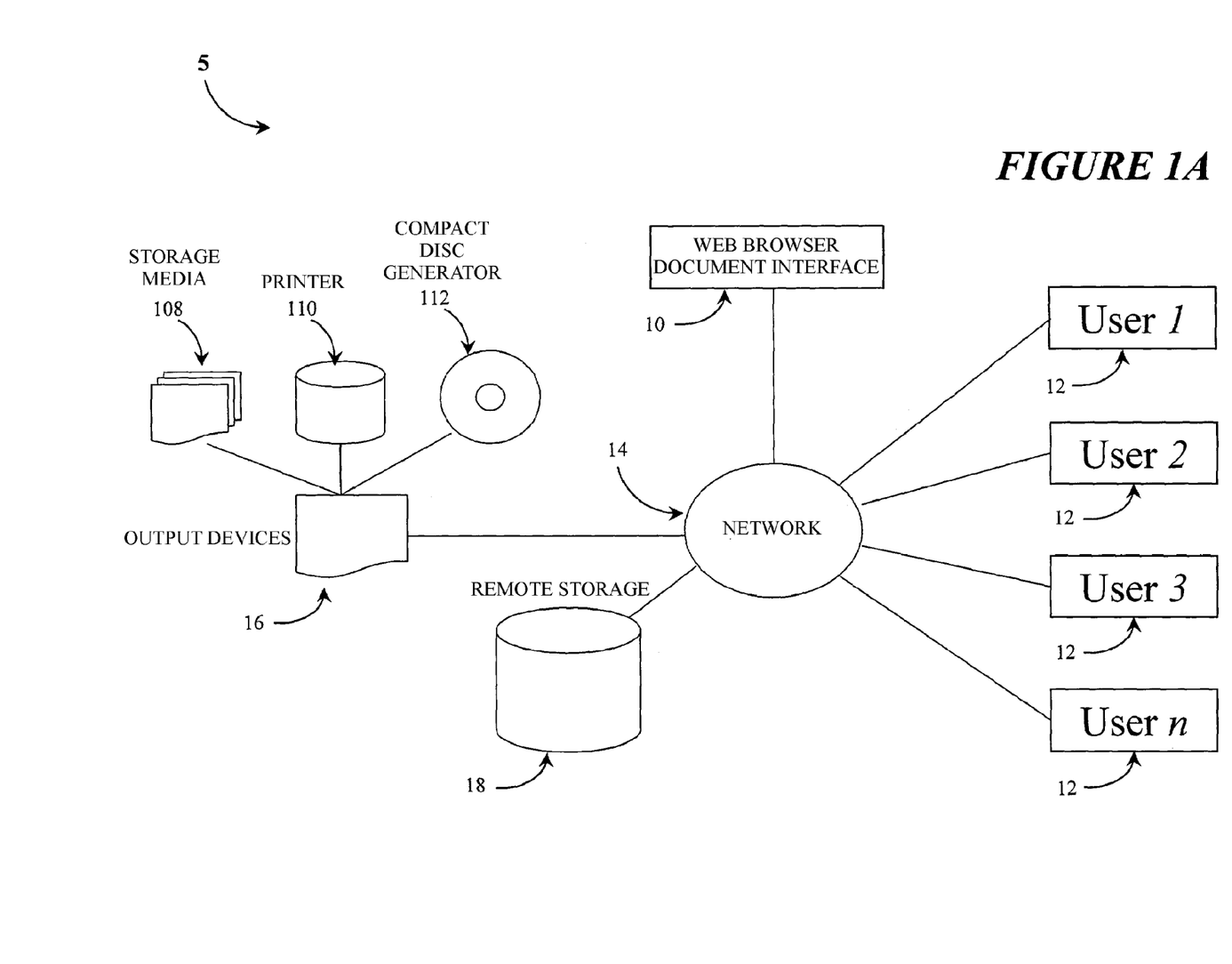
FIG. 1A illustrates an implementation of a preferred embodiment of the present invention in a network environment.

FIG. 1A illustrates a Knowledge Management System (KMS) 5 that is integrated with a computer network system. The KMS 5 includes a web browser document interface (WBDI) 10 coupled to a plurality of users 12 and remote storage 18 over a network 14. The web browser document interface 10 includes components for performing remote or local document management, security, archiving, document collaboration among multiple users, system auditing and audited document access, digital document verification, variable levels and types of document indexing including document content indexing and processing (such as optical character recognition, OCR), and external document storage 18 for connected users 12. Users 12 also have access to output devices 16 for publication, document transmission or storage outside the KMS environment. These components are described in more detail below with respect to FIG. 2.

The term 'index' used herein refers to multiple levels of information related to a document or set of documents. An index is more than simply a pointer (as the pointer on a scale) that serves to indicate a data value or quantity. An index is both a pointer and a linking device, and the index can represent or contain a dataset of all the values pointed to. For example, consider a set of documents (which may be electronic records) containing the personal information for a group of people in a company. One index can point to the all the names of the employees. The 'names of employees' index then is a dataset of all the names and points (links) to all the documents where these names can be found. Because the names are linked to the personal information documents, the 'names of employees' index is also linked to any other indexes (e.g., age, address, income) that are associated with the personal information documents. These other indexes may be pointers or pointers and data values. At another level, this same 'names of employees' index may be divided into salaried employees and hourly employees, and so two other indexes are created that are subsets of the 'names of employees' index.

Figure 1B:
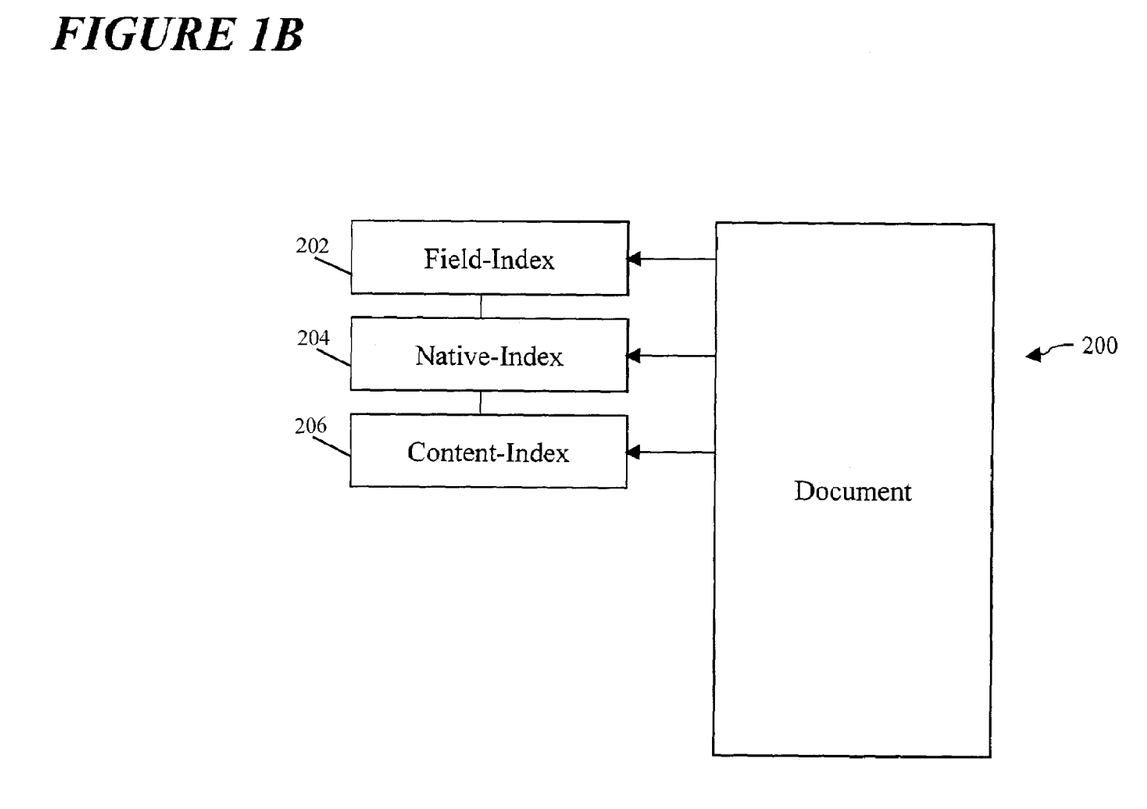
FIG. 1B illustrates multilevel indexing.

FIG. 1B illustrates an example of the multi-type indexing that may accompany an uploaded document 200. Document indexing types include a field-index 202 that contains user input index information associated with a document. Field-index types and values may be chosen or assigned by a user uploading the document to the KMS. Another type of index is a native-index 204 that contains information naturally associated with a document such as file format, creation date, modification data, identities of users who have accessed or edited document content or indexes. Still another index is the content-index 206, that is an index of the characteristics of the document contents, for example the text a document contains.

Figure 2:
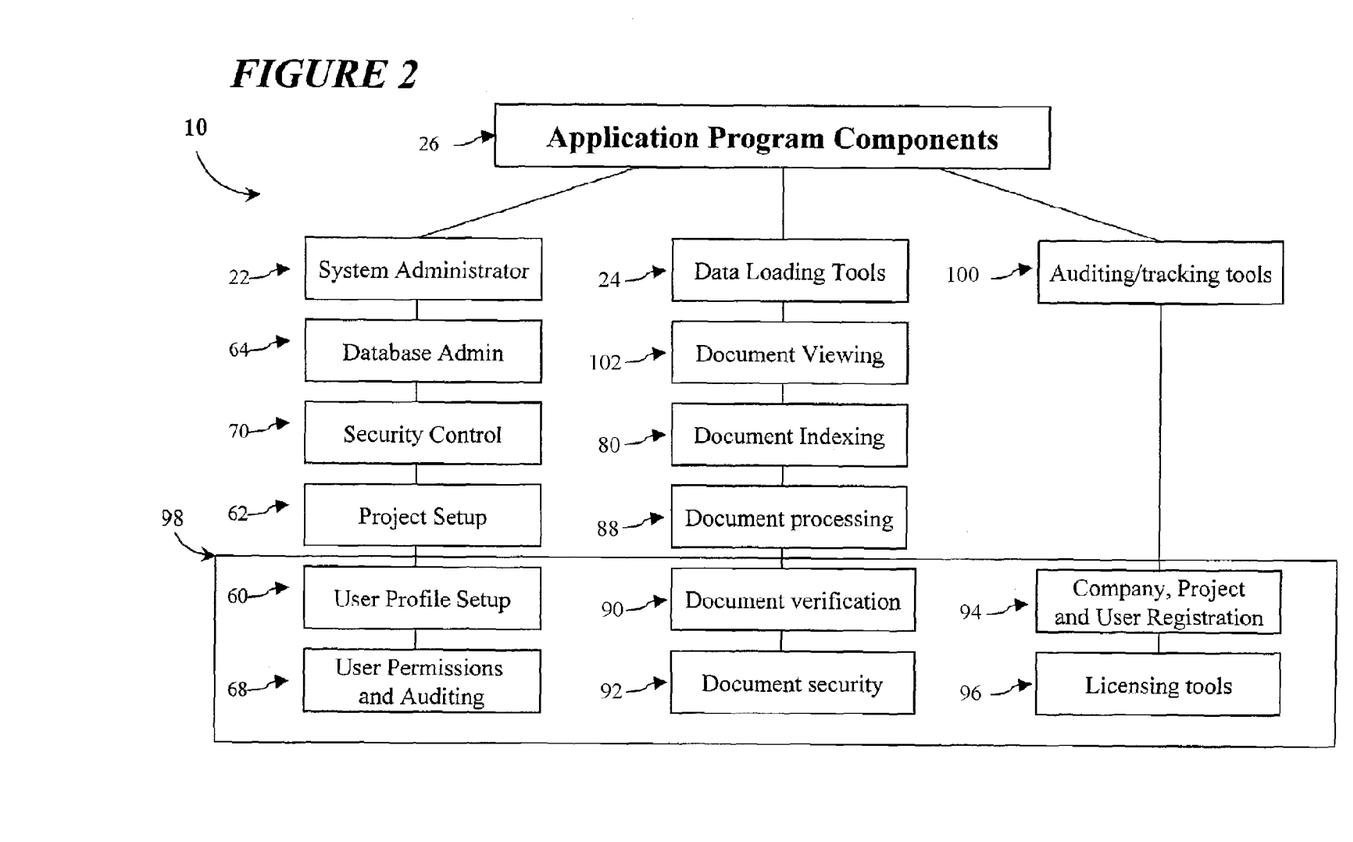
FIG. 2 illustrates the components of an application program of the present invention.

FIG. 2 illustrates examples of the system or software components the KMS shown in FIG. 1A can have. The application program 26 for the web browser document interface 10 includes a system administrator 22, a data loading component 24 and program management tools 100, all of which are coupled to an application program 26 resident on a computer, computer server, an application service provider (ASP) server or network server. The system administrator 22 includes a user profile component 60, a project setup component 62, a database maintenance component 64, a tracking/auditing component 68, and security and permissions component 70.

The application program 26 further includes a multilevel indexing component 80, a document processing component 88, a document audit component 90, a document security component 92, a company registration component 94, license verification 96, an integrated system security structure 98, a tracking, accounting and billing component 100, a document viewing and editing component 102. Coupled to the application program 26 through the web browser document interface 10 over the network there may be peripheral output devices 16 such as storage media 108, a printer 110 and a compact disc generator 112.

A security structure 98 provides user authentication, document authentication and document verification. User authentication is based upon project or company designated requirements. The security structure 98 controls access to document and indexing information over the network 14. The security structure 98 enables user access to the browser functions 10 based on predetermined requirements. All user interaction with the system may be logged and audited for security audits, and all changes to any documents or database information can be tracked to enable a 'roll-back' of changes. Authenticated users are permitted to perform activities predefined by the System Administrator.

Also, the security structure 98 provides an interface that allows a System Administrator to modify security information and profiles for information, documents and users. A user may access or perform actions relative to documents and document indexes based upon the profile set up by the System Administrator. The users' system activity information is logged and provided to the system administrator.

The security and authentication component provides secure user communication with other KMS users. The secure communication may be additionally enhanced by an encrypted system environment. The present invention performs in an encrypted or unencrypted environment.

The KMS security structure is integrated with the multi-level system indexing in combination with defined access restriction controls. Defined access controls can be based on User Profiles.

The audit trail/tracking component 100 provides auditing of user interaction with the KMS application and archived documents processed by the KMS application. Each access and any changes to documents or other database information by any user is recorded and the access history is viewable by the system administrator, including the document's author/indexer and other parties designated by the system administrator. Additional indexing and grouping capabilities are also selectively available to 3rd parties that have access to the system. For example, documents may be supplied from the database in form for display in specified environments like a public forum or a legal discovery situation where the document can be redacted in part.

Figure 3:
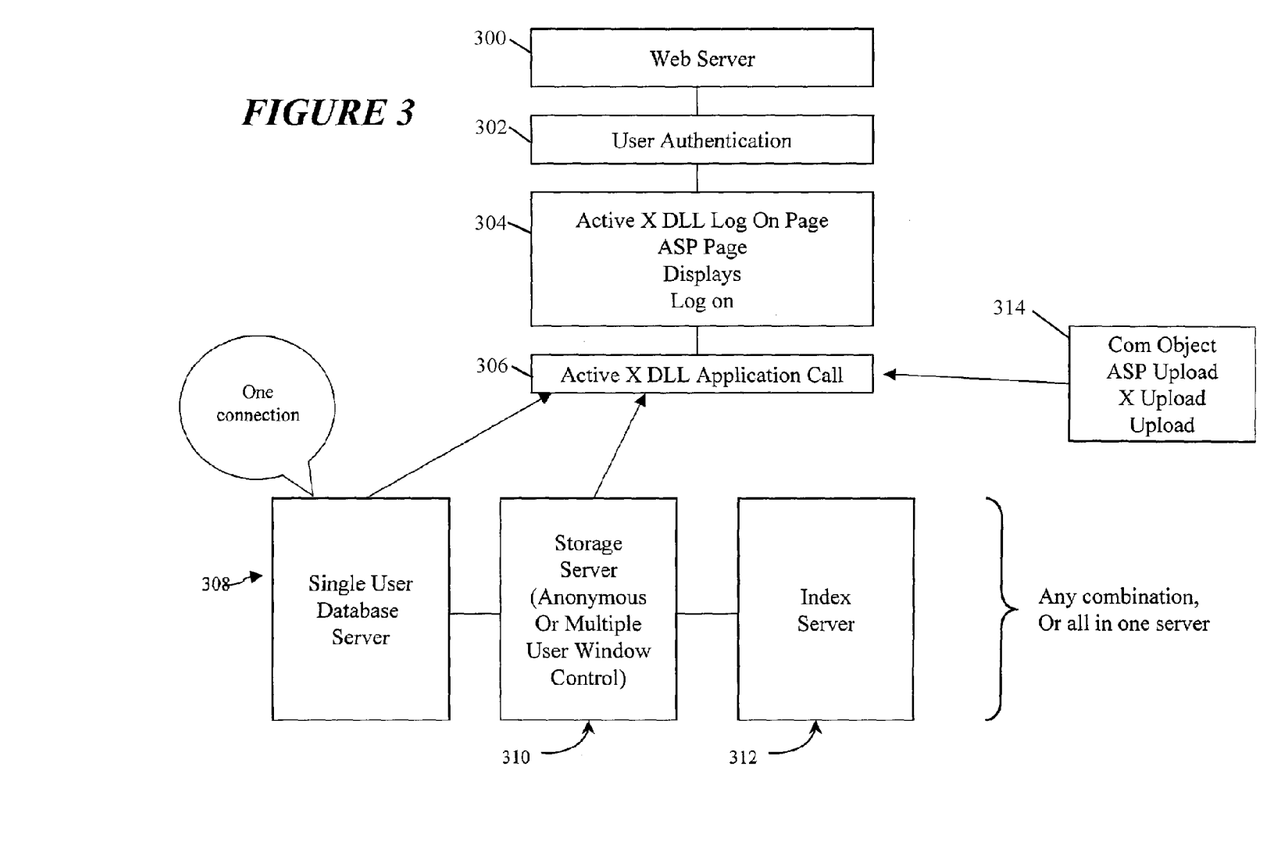
FIG. 3 illustrates an example of system architecture for the present invention.

FIG. 3 illustrates an architecture for one embodiment of a preferred KMS. A web server 300 host computer contains program and storage for the preferred KMS. User authentication 302 verifies a user and the application is then ready to for use. A logon web page is launched 304 which may be an Active X environment. The Active X environment may provide interface capabilities for application utilities, for example, scanning, uploading, OCR functions, etc. The program may run a logo of the service organization providing a KMS, for example an ASP. The displays and logon are initiated at the host ASP to facilitate application startup. In an alternative embodiment a preferred KMS is hosted on an intranet server.

After successful login to the application, the applications calls 306 or subroutines initiate as the program runs. The application calls may be varying types, for example 314, and be configured for specific projects, companies or ASP environments.

The KMS application runs on one or more servers concurrently, which can be of varying types. A single user database server 308 can be used alone or in combination with a server or several servers for multiple users 310. The KMS enables an index server 312 to be combined with one or more servers.

In an example scenario, a user logs onto the browser 10 and is presented with a number of options for system use. The KMS enables documents relevant to a project to be indexed, accessed, edited or otherwise disposed of. Documents may be indexed while the documents are being added (uploaded) to the project. Indexing can be done automatically and/or with user interaction. Documents can also be removed from the KMS. Upon accessing and using the KMS browser 10 an audit record is produced recording the time, activity and level of access.

Figure 4:
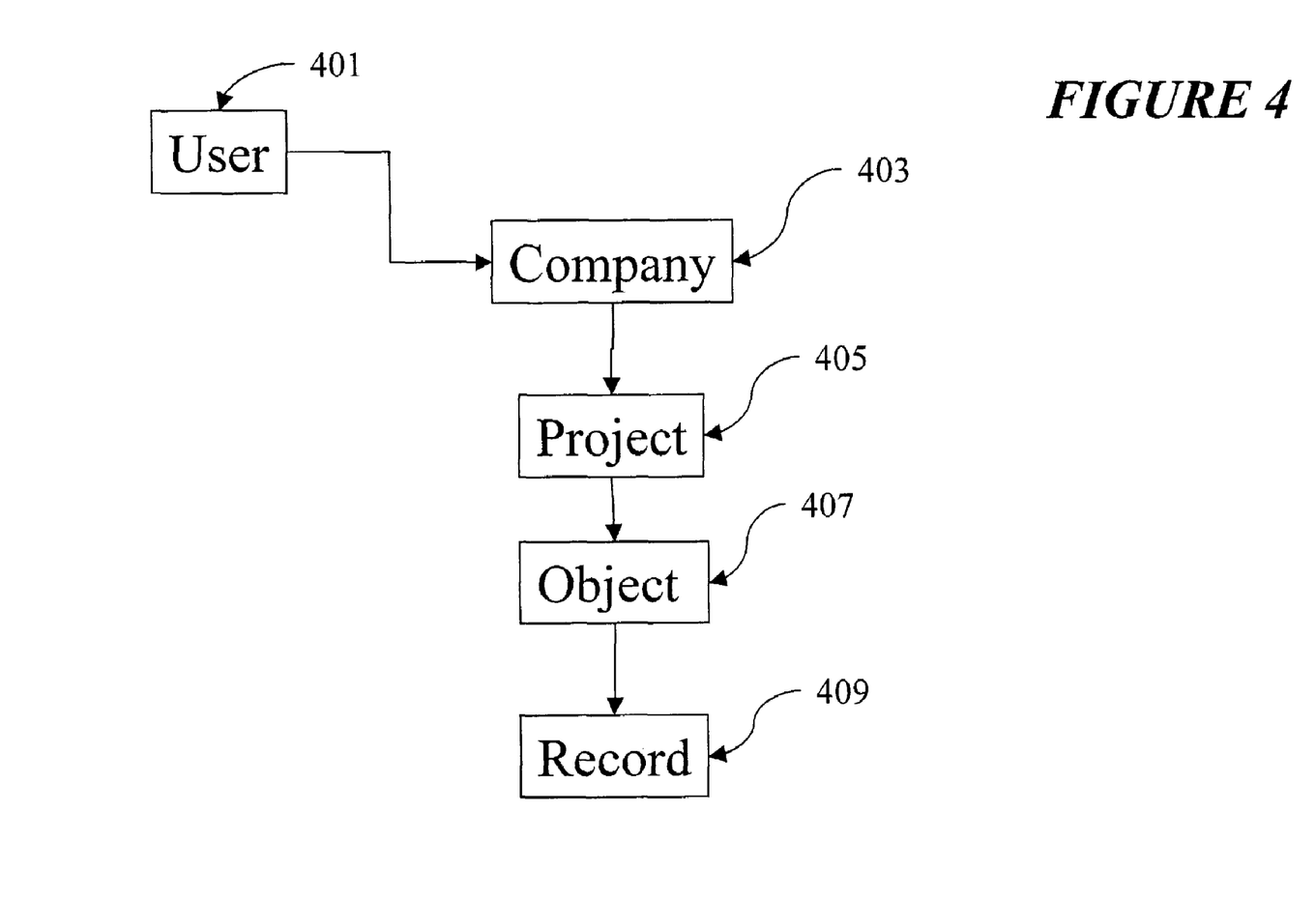
FIG. 4 illustrates an example of a data architecture for the present invention.

FIG. 4 illustrates an example structure for project management using the method and apparatus of the present invention. A User 401 will access the system at the Company 403 level where the User 401 will be authenticated for access. A Company for example may be a client, a meta-project or group of projects. For each Company 403 a Project 405 may be chosen. An Object 407 will belong to a Project 405, and represents the organizational 'parent' level of the KMS structure. For example, this Object 407 could represent a subject like 'John Smith' and would be linked to all the other material associated with (documents and information) John Smith in the database. A Record 409 is then a document or other information related as a child to the parent Object 407, in this example John Smith. The Record 409 is then a 'child' to the Object 407 parent. This two level relationship is important in enabling information entry into the KMS without having to repetitiously enter redundant information the database already has.

Figure 5:
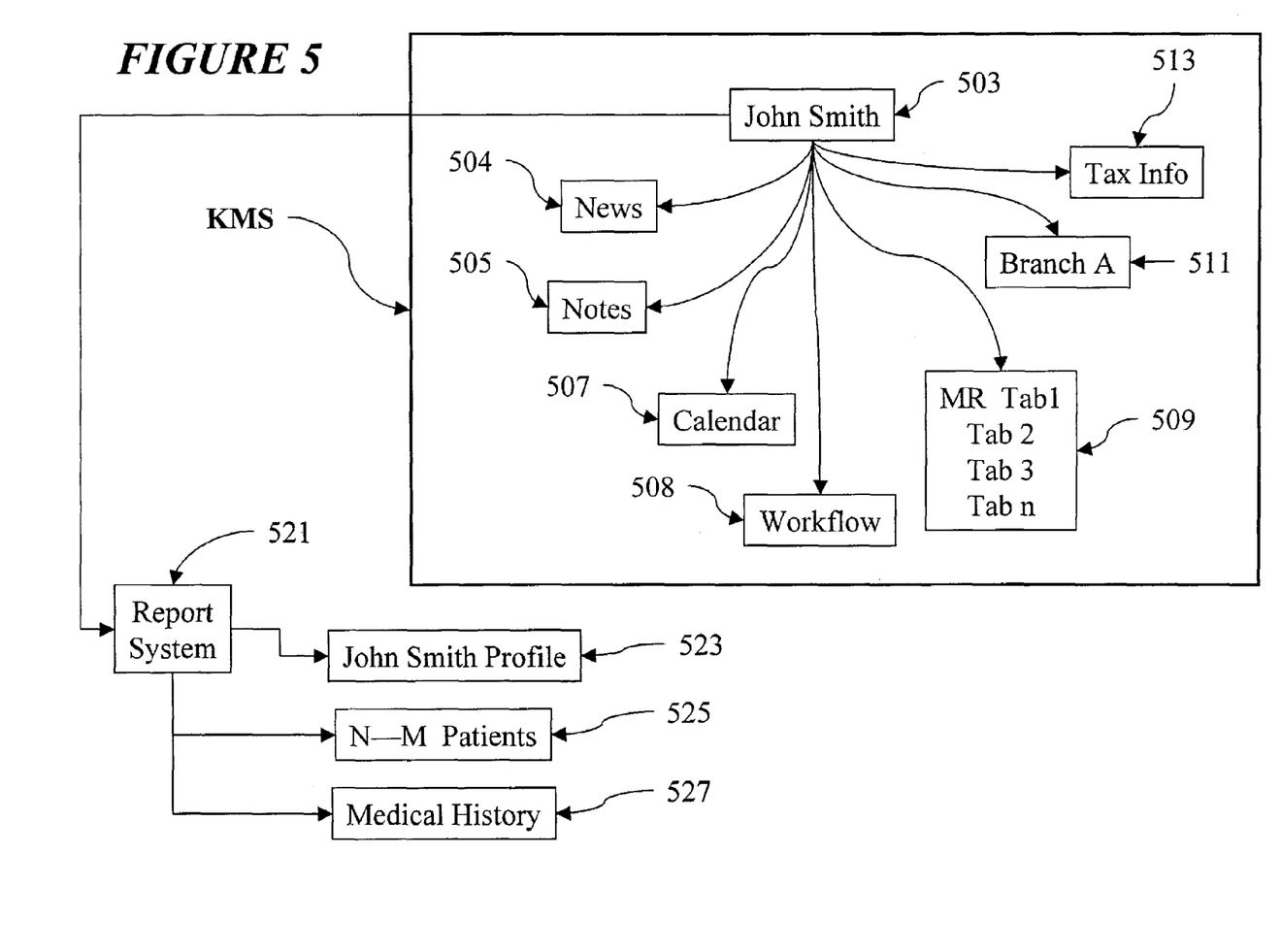
FIG. 5 illustrates an example of an element within a data architecture for the present invention.

FIG. 5 illustrates an example of a parent Object like John Smith 503 and how the Object is related or linked to its children or records in the KMS database. Object John Smith 503 can be related to many children Records including, for example News 504, Notes 505, a Calendar 507 system, a Workflow 508, multiple Medical Records 509 represented as Tab 1 through Tab n, general information "Branch A" 511, Tax Information 513 and any other information Records linked naturally or arbitrarily with Object John Smith 503. A feature of the Object John Smith is that the Object may be used to display all the information that is common with all the records or a selected group of records, or, the Object may be used to display all the information that is different among all the records or a selected group of records.

As illustrated also in FIG. 5, the KMS also has the capability to facilitate the creation and provide for the storage and dissemination of Reports 521 about Object John Smith 503 that may be created using information from the KMS method and apparatus. For example, a report 523 about John Smith 503 may be created using the information from Records 505, 507 and 509 or others, from which elements can be compiled to form a profile of a medical history 527, a payment history or any set of significant elements to create a desired report 525 and stored as children 523 and 527 under parent John Smith 503. Other patients or parents N-M 525 can also be assessed and updated using report system 521. Databases and triage query results can be stored as children under parent 503 John Smith 503.

The system administrator enables User Profile creation for a project or company. The Four User Profile categories are:

System Administrator: The top level system access and control environment. This is the highest level of security. The System Administrator may create/edit/delete projects, user profiles and groups. The System Administrator may upload and index documents as well as define search and display criteria, and track usage of the entire system.

Administrator: For project and user administration a company and projects level. This is a second level of security. The Administrator may create/edit/delete user profiles and index and upload documents.

Power User: May search over all projects in a company level. This represents a third level of security access. Power Users may upload and index documents to all projects to which the Power User has access.

User: May only search existing projects in pre-defined ways with possibly pre-defined restrictions.

Table 1 is an example of the security levels of the KMS is provided by the following list, an example of an information help screen:

TABLE 1

Four User profiles with different security levels:

Systems Administrator

Highest level of security
Create/Edit/Delete projects, user profiles, groups
Upload, index uploaded file
Define search and display criteria
Track User usage
Administrator Second level of security
Create/Edit/Delete user profiles
Upload, index uploaded file
Power user Third level of security
Upload, index uploaded file
User General user
Only allowed to search existing projects The Company Setup facility is an administrative utility used for creating and tracking company and/or project activities. A Company may be a corporation, a business unit with a corporation, or any group linked to a project or a set of projects. The Company Setup facility contains functionality for: login (top level system access), tracking of company or project, display of all companies or projects, administration of companies or projects. A Project is a specific task or problem engaged in usually by a subset of all the users in a company, for example a project may be a lawsuit. A company can include one or more projects. Companies or projects may be tracked and audited according to system administrator desired parameters (for example, date range).

Table 2 is an example set of instructions for the Company Setup facility of the KMS:

TABLE 2

CREATING A NEW COMPANY/TRACKING COMPANY USAGE
During Logon the user is provided the menu options:
Track/Company

COMPANY

Select Company
A list of all existing companies will be displayed
        Additional Company options:
Edit/delete any existing company by clicking on the icons right of the
company name
Edit/Delete or Add the Systems Administrator(s) by clicking on under
the Systems Admin column
Edit the number of users by clicking under the User Set Amount column TABLE 2-continued CREATING A NEW COMPANY/TRACKING COMPANY USAGE
During Logon the user is provided the menu options:
Track/Company Click the 'Add a New Company' button
The Add New Company menu appears
Enter the information for each field
Click the Save New Company button
TRACK Select Track
        In the Logon Name Track menu, track by;
Date range by entering the date in the appropriate field
Company by selecting the company from the drop down menu
Both date range and company by entering the date range and selecting
a company Table 3 is an example of instructions for creating a new project in the Project Setup facility:

TABLE 3

Creating a new Project

Select Tools
Select Projects
Existing projects will be displayed
Click the Add New Project bar
Fields Field names are important when searching the project. Create fields that
are essential and relevant to the project (i.e., first/last name, social
security #, date of birth, etc).
Project Name: type the name of the project
Field Name
Field Type
Click Add New Project When a project is created there may be tools available for project administration. Available tools may include: Create Project, Group create, User create, User profile designations including access restrictions, display restrictions and search restrictions. The Create Project tool or utility will define the parameters of the project and include access to the database. The Group create tool will define the users for the project. User create will define user attributes including security permissions and restrictions. There may be tools for uploading documents and for tracking documents and users. The capability of searching for, by and through documents by multiple levels of indexed information associated with the documents is an important feature of the present invention.

The system administrator provides tools to set up groups that collaborate on projects. Table 4 is an example of instructions for the System Administrator group setup:

TOOLS
Groups

Groups can be created to view only the project associated with the specific
group.
Select Tools
Select Groups
Enter the name of the group in the Group Name field
Assign Project(s) associated only to the specified group
When a member of this group logs on to the System, the member has
only the assigned projects to view
Click Save New Group Users who may use the KMS with the browser 10 may be created by the upper level System Administrator or Administrator. Table 5 is an example of instructions for creating users:

TABLE 5

Users

Creating/Editing/Deleting Users
Users can be created as a general user logon for all users or as individual user logon.
Select Tools
Select Users: a list of all existing users will be displayed
Click Add New User
Type in each field
Select the Security Level
Assign the project(s) associated to this specific user
Click Save New User Tracking or auditing of the KMS usage is available to the System Administrator using the tracking tool, for example as in Table 6:

TABLE 6

TOOLS
Track

A tool tracks user usage by user and/or date and view every time the user logged in and logged out. Of the System.
Select Tools
Select Track
Type in the date and/or the user name
Click Begin Track
Usage track will display below the track menu Search restrictions are used to restrict user access to documents, portions of documents, indexes or portions of indexes. Portions of documents may be redacted by software 'blackout' overlays or equivalent processes based on the access privileges of the user. For example in a browser display of personnel records, while all users may get access to all personnel records, only a predefined subset of users can view personnel records containing viewable salary information. The redaction of the salary information may be simply by a 'blackout' overlay, or a dynamically reformatted document is displayed upon access. Table 7 is an example of instructions for the search restrictions setup:

TABLE 7

Search Restrictions Setup

The Systems Administrator and Administrator has the right to restrict the Search Criteria and fields Displayed for each user
Search Restrictions assign values to a specified field and prohibits the user to search on any other value for that field
The Search restriction field will not be displayed in the Document Search menu
    Search Restrictions
Select the User
Click Edit under the Search column
In the Search Restrictions menu, Select the project in the project(s) drop down list
Select the field to restrict
Enter the value to search on in the Search for field
Click Save
Click Save Search Restrictions In the above example, a last-name field search can be restricted to a search on 'Torres.' In a view of the browser 10 using this option after search restrictions are implemented, the Document Search menu screen does not show the last name field because only the last name field-index value 'Torres' is available to be searched with.

Display restrictions may be implemented to hide specified fields or other information associated with a document, for example field-index information, after a search has been made. Table 8 is an example of Display Restrictions implementation:

TABLE 8

Display Restrictions Setup

Display Restrictions hides or reveals specified fields in the documents found after the initial search
Display Restrictions Select the User
Click the Edit under the Display column
In the Display Restrictions menu, Select the project in the project(s) drop down list
Pick the fields to display or undisplay (hide) and use the arrow buttons to move the fields within the display
Click Save Display Restrictions An exxample of a restriction is an implementation of a restriction on displaying a social security number. The SSN field can be hidden in the search result, for example, the browser display of the returned documents.

Table 9 is an example of a screen to provide instructions for document uploading:

TABLE 9

Upload

Select Tools
Select upload
In the Project field, select the project from the drop down list
Click Select File or Select Folder depending on where the file is saved
Select the file(s)/folder(s) and click upload!
You have the capability to upload several different files at once
You have the option to index the files after you upload by clicking the Common Properties button and entering the information in the fields, or you can index the fields under Projects after searching for the uploaded files (see Indexing for more information)
You also have the option to remove any uploaded file(s) by selecting the file and clicking Remove or simply clicking Remove All Document indexing levels include a field-index that contains user input index information associated with a document. Another level of index is a native-index that contains information naturally associated with a document such as file format, creation date, modification date, indentities of users who have accessed or edited document content or indexes. Still another index is the content index, that is an index of the characteristics of the document contents, for example the text a document contains. Users will create other indexes and index categories as needed.

The content indexing capability can be enabled for any document as well as for documents to which OCR or another reformatting facility has been applied. The user who uploads a file may have optionally applied OCR to the document while loading the file to a storage location. The content index may contain accessible information based on the document text or other document characteristics.

Table 10 is an example of a help screen to aid users indexing files while uploading documents, or indexing already uploaded documents:

TABLE 10

Indexing

During Upload
After uploading the file(s)/folder(s)
Select the Common Properties button
The Common Properties menu pops open and the fields saved for the specified Project are displayed
Enter the values for each field
Existing Uploaded File
Select the project to search under Projects
Search in the Indexed field and select no from the drop down list OR search in the Uploaded by field and select the user The entire contents of a selected project may be searched. Fields are created when the project is created, and these field names and categories will be displayed to search. Information may be entered on one or more of these fields. The 'content field' allows searches of OCR'd documents.

The Administrator has tools to add or delete users and to upload files. The Administrator is not allowed to view the properties of the Systems Administrator but is able to view the properties of all other users. The Administrator does not have the right to create/delete projects.

The Administrator has the ability to supervise projects. The Administrator is allowed to view and search existing files and audit information, but does not have the right to create/add/delete projects. The Administrator also has the right to search Indexed and/or Uploaded database information by fields.

A Power User may upload and index data, and so has access to upload tools. However, the Power User has no administrative privileges. The Power user can search any assigned Projects.

The User level interaction is restricted to the lowest level of access permissions and is flexible enough to be designed for a wide range of uses. Examples include allowing a defined user to be have access to medical records based on specific and/or targeted criteria. Such a user may be a patient, a doctor or hospital, or a person with a specific need for access to information that must be otherwise controlled or restricted. Examples of controls are field-index restrictions which include name or social security number. Access controls may be applied with any level of indexing, including document content. Access may be time controlled as well. Access may be limited to a set number of occurrences or from specified locations, computers or network addresses.

Table 11 is an example of a User help screen:

TABLE 11

PROJECTS

Select Projects
Select the project to search
Enter the information in the field to search
Use the HELP on the upper right hand of the Document Search menu for additional search options
Search results will display at the bottom of the Document Search menu
Select the file to view and click view
The file will open The following description is example of document management performed in accordance with the present invention. The System Administrator sets up a project for use. Administrative and/or Power User accounts are assigned, along with Users.

A document to be archived, which may be on paper, video, magnetic media or any digitally based archival media, is prepared as a machine readable document for uploading to the database. The document can be an audio message to be converted to text (or not), an image to convert to objects and text or only text, all of which are indexed during and after-uploading, and stored by the KMS to the database. Default storage indexing indicates the type of source file (e.g., audio, image, etc.). For example, a paper text document or an image on paper may be scanned to form a digital document. Other indexes can be chosen by users. This document is uploaded to a storage device that contains at least part of the database, for example, storage media which is resident at an application service provider (ASP) location or uploaded to a local intranet storage device. In the case of a document containing text or text and images, an OCR application may be used with the document before or after uploading. The OCR facility or similar reformatting utility can be used to turn an image into text and objects or other recognized characters. The user uploading the document assigns desired attributes (or index fields) that become associated with the document and may be used to search for the document and its contents subsequently. Various indexing tasks are done automatically during upload (and later when documents/files are accessed), other indexing tasks are undertaken by users both during upload and later access and use. The desired attributes or indexes explicitly assigned by the uploading user are stored in the field-index associated with the uploaded document. Some examples of field-indexed attributes that may be created when the document is uploaded include document name, creation date, ownership, permissions associated with subsequent access, content, content subject and even which indexed attributes may serve as a basis for restricting access to the uploaded document. Then, the document is available to users accessing the project (based upon any user access restrictions). Versions of the archived document may be saved for auditing purposes, or alternatively, a profile of the document changes may be archived with the document or any of the indexes. User or group member comments relating to a document may be recorded using any desired indexing field. Encryption capabilities can be included at any stage of the operation from initially indexing a document to encrypting the final uploaded document and/or any of the indexes associated with the document.

The following is an illustrative example of a process of a user interacting with the present invention described above in FIG. 2. General user information is provided as part of the user log-in process. This information includes data related to the personalized viewing of documents, such as restrictions associated with users or database information, and default filters applied for narrowing the displayed document list or information documents contain.

After a user logs into the KMS using the browser 10 over the network 14, an example to-do list may displayed to the user with the browser based screen displays. The to-do list is a list of actions for which the user may apply to a document or document index to be archived. The following is an example of one embodiment of the invention involving knowledge management actions involving documents: Scan document, review document, assign field-index types as/if necessary, populate fields of the field-indexes, upload scanned document, apply OCR or other data interpretation or formatting utility, initiate native-field indexing, initiate content-indexing (automatic, pre-defined or user specified), assign access restrictions, quality control uploaded document. For any document to be input to the KMS, these actions may be performed by one or more users at one or more times, and one or more of these actions may be automated.

Action items have a direct link in the browser 10 viewing page to perform the desired action. Users may customize their document viewing. Creation of field-indexes creates entry fields to populate for the field-indexes on subsequent browser pages. The browser 10 provides an interface that groups indexing/uploading actions to be performed by the user, and a list and access to automated actions. A to-do list can be generated. Each user has previously assigned account level permissions that may include enabling the user to Archive, Edit, Index, Access, Restrict Access or otherwise process the documents as required.

There is no restriction on document types or formats that may be managed by the present invention. Any document type or format may be entered into this KMS. A document is data record; it is a collection of data, knowledge or information which may be on any media that is machine readable or capable of being converted to machine readable information and loaded to a database.

An editor for document modification can be included in the browser 10. In a preferred embodiment, the files are saved in html format, and all changes (in any format) can be tracked including when the changes were made and what entity created them. The document editor may modify the document in the existing document format, or convert it to another format.

The browser 10 system may have default archival rules for a document for both field-indexes and native-indexes. For example, a set of field-indexes may be first name, last name, company name, etc. A set of native-indexes like file type, data format and creation/upload date will be generated during data upload. Other index types may be pre-determined and automatically generated and associated with documents in the data base.

A document to be uploaded to a database is called the target document. The user upload interface in the browser can present a screen view that contains specific or general information on the target document and a related indexed section containing document history that can contain all changes and how and when they were created. The information can include: Document name, Owner, Creation date, file format type, company/project specific attributes, attributes defined by the user (field-indexes). All activities relative to a document are recorded using an audit record or profile.

Example of categories indexes and attributes that can be associated with documents include Accounting Audits, Companies, Projects and Users. In addition to these categories, auditing includes measuring application usage categories such as time, dates, number of usage, time connected, number of users, amount of data, quantity of data entry, and tracking document changes. Billing and licensing requirements may be associated with audited categories.

The number of users in any project or database area may be limited. This is termed user quantity control.

Examples of data access profiles include Global, Private and Shared. These profiles, similar to a processing history or 'favorites' list, may be used to facilitate data retrieval by targeting databases or database categories and prior searches. Data access profiles facilitate time savings for users when searching or archiving documents and datasets.

The application or service may optionally provide a logo or branding capability to the browser screens users and companies will use. The file for the logo may be resident on the local computer or the computer the DSM is launched from.

System administrators have deactivation capability for each Site, Company and Users. The licensing functionality of the application system or software can allow for selective access and access restriction that may be based on Site, Company, Users or other attributes.

To protect the integrity of database and document information a unique field check may be performed to limit the ability to overwrite or modify data. File names, document names and index names can not be re-used, repeated or overwritten.

Computer files of any format, including image files containing text, may be content indexed according to the text in the document, using OCR if necessary. The indexing can be created 'on the fly' as documents are uploaded.

Some files contain viruses or other problems. Files capable of containing viruses may be filtered or blocked from the uploading to the KMS, and virus filtering/extraction utilities can be applied to documents.

Project Fields may be rearranged. The order of indexing fields associated with archived documents may be changed.

Application set-up tools can be implemented. A walk-through process to allow administrators and users to set up projects and get started easily. Examples include aid in setting up accounts, projects, groups and users, along with security access control implementations.

Scan software is included in the KMS. Documents may be automatically scanned in bulk. Index fields of any type can be populated automatically as documents are uploaded. Other reformatting utilities can include OCR functionality.

Dynamic Information Redaction (dynamic access control) capability can be enabled for sensitive or restricted information. KMS image viewing restriction may be incorporated into the browser application and formulated for the document to be displayed in redacted form on any viewer. Security arrangements for documents can be enabled to allow only specific information to be viewed when a document is accessed. For example, a medical records specific browser allows database access of redacted document viewing tailored to the users permission profile, e.g. physicians see medical information only, accounts receivable see billing address and billing related information only, etc. In this situation, the line between 'a document' and the database has been effectively erased. A patient's "record" becomes all the information linked to the patient in the entire database in the manner disclosed previously. How the information is accessed and displayed depends on the permissions of the users and the access controls associated with the documents, indexes and users.

Data existing in electronic files may be indexed without going through the KMS browser, by automatically capturing the information to be indexed directly from the electronic file. The electronic file is uploaded together with the indexed information. An example of automatically capturing information without going through a browser is the Automatic Directory Upload. Documents may be uploaded to a database without direct user interaction. For example, any file appearing in a specified directory (for example a directory of faxed files) may automatically be uploaded and indexed without the use of the KMS browser to initiate an upload of individual documents.

Email information is available from the Profile if problems occur with the KMS. Profile is a collection of information about a specific user, index, subject or document. Profile (for example a favorites list) information may be contained as a file that can be electronically mailed. Error information related to a system or application is more easily passed to technical support groups because it can be captured in a predetermined format.

Screen capture can be used to populate index fields. A user may use the browser application to highlight information to directly populate index fields. Legacy applications may be converted to a current archival system without duplication of data entry for indexes or content. For similar documents, highlighting areas to be indexed may be used to streamline indexing and redaction tasks across multiple documents.

Delimiter use is streamlined in the present system and application for document uploads. Comma delimiting indexes can be used during uploads (or equivalent other delimiter). The system allows for format sharing and facilitates automatic indexing capability. Output may be optionally delimited using desired delimited format, or any desired format.

Many of the usual capabilities computers and computer programs contain may be accessed directly through the invention application. For example, CD creation capability may be included in browser application. Software registration may be included during the confirmation of system installation. License upgrades for companies are optionally available immediately with login to the KMS.

Blackout and highlighted areas in an image are presented depending on the user profile and how information restrictions/filters are to be applied to the user. Users (uploader) may define areas of imaged documents to be redacted to other viewers. The uploading user may designate portions of text or image to be redacted or highlighted. KMS browser can block areas of images depending on parameters in document indexes. Redaction implementations for a particular accessing user are based on access restrictions. Blocking may be by word, by index, by index value. Thus, a word in a document may appear bold or otherwise colored if highlighted, and blacked out or removed altogether if redacted.

The KMS browser can have several options for viewing documents and database information. Large image data files may be handled by KMS browser system by image tiling or data decimation.

Index searching can be enabled for attributes of indexes over ranges of index values. For example, a date range search. Date range searches can be performed and further restricted by other access controls. Other values of related indexes can be searched according to index ranges or within a set of parameters. For example, a date range search over a first index may be used to produce search results that include other indexes and index values that are associated with the first index.

To simplify uploading or project searching, index lists may be edited. This allows for the a subset of the current complete list of fields for document set being uploaded to be simplified.

The method and system of the present invention includes a utility of new data and records that meet pre-determined criteria. This results in a virtual ongoing search, with automatically indexed information. A search is enabled that peruses new information as new documents are indexed and uploaded by the KMS. When certain new information meeting the search criteria is found, the requesting user can be informed of the occurrence.

The method and system of the present invention is not restricted to any specific system configuration. The KMS can be completely browser based where there is no component that is client-server based. At the same time, many of the indexing and uploading utilities can be completely automated.

As data are uploaded and indexed, triage, statistics and calculations can be determined during the uploading process. These are termed "Aggregated functions" and allow for automatic data calculations (like statistics) directly on selected fields or data in the database and documents being loaded into the database. The aggregated function results can be dynamically updated as new documents and data become available. This enables tasks like data population averaging to be performed as data are accessed during document storage.

The databases for the method and system of the present invention require at least a minimum amount of redundancy so that data are not lost. For this, database can be 'mirrored.' Mirroring capability means that there are two separate locations where data are stored concurrently. This redundancy reduces the possibility data will be lost if data are lost at one location. For example, when data are uploaded (or OCR'd), they are uploaded (or OCR'd) to two servers.

Documents can be archived with a retention schedule. Retention schedule tools can be built into the application to facilitate document management. Some types of documents are required to be kept for specified times, and this can be part of the document attributes.

A document in or loaded to a database may have associated tasks. In order for documents in a database to receive the attention a project requires, a 'Workflow' may be assigned to one or more documents. Workflow is a process to notify a user when a document is available to be worked on or checked, as well as what has been done to the document and what needs to be done. Document change tracking is enabled, as well as built in deadline checking. The Workflow process is able to construct and maintain a trail of where the document has been and what changes have been made and what tasks need to be performed. In association with the Workflow, an 'autoinform' facility can be included to automatically inform other users when documents are available for use, or are being used.

The method and system of the present invention can include an automatic 'Page Link' facility for retrieving past images seen in a browser session, or alternatively for providing a link to a specific document. Links may be directly inserted (for example with the document editor) into a document to facilitate movement within a database. Additionally, print orders putting together a "print set" as an order online for printing, may be sent to a printer or to a vendor without leaving the application.

The method and system of the present invention can include News capabilty for general system news, administration matters including policy, procedures and scheduling. The News facility will commonly be initiated at system start-up. Additionally, a Bulletin board is provided for project level environments. This is a repository for information, communication and community knowledge which may be specific or general to a database, project or user group.

Search Queries that have been applied to a database may be saved as originally formed, and actuated on the present or future database. This can be termed "Query Save" and facilitates search consistency for user groups and projects, and adapts to evolving database conditions.

Other applications that can be directly accessed from within the system environment include a calendar facility, which may be public or private, or a combination of public and private, any kind of posting, reminders, etc. A tutorial online is provided, in addition to help screens. Common password help utilities are available. Documents may be dispatched from the database by email (depending on restrictions) without having to exit an application.

The method and system of the present invention includes a facility to track all changes to document and the facility to undo those changes. This is termed Version control or Version revision control for documents. Version control provides for a revision rollback capability. Additionally, there is also provided a work in progress (WIP) control for sharing files and documents across projects and among users, allowing users to access files concurrently.

A sophisticated data review is enabled through the process of content indexing as records are upload using the KMS. For example, a triage process (sorting and allocation) to put the triage fields in a document properties index (such as the content-index or field-index) as the user is reviewing the record. The KMS can automatically index occurrences by the page or location within a document. The event occurrences can be based on predetermined field or event occurrence criteria, for example, every time a live function is performed or recorded or when a liver function is out of range. A manual or automatic history or trend analysis may be generated as the document is uploaded by the KMS.

For instance, a medical records examiner can review a document to upload containing four liver functions that are to be looked every day (or document/record interval) that are flagged and indexed if they are above a certain level (or within designated parameters). Every time there is a liver function measurement event, the user or system is going to index those liver functions corresponding to the measurement itself and to the occurrence of the measured liver function within the document. In this way a trend analysis or adverse event history may be generated as the KMS uploads and archives a document while indexing, either automatically, manually or both. The index becomes a tool for automatically generating trend analysis data. This trend analysis indexing capability can be used manually or the trend analysis indexing can be performed automatically as documents are uploaded using the KMS.

The KMS enables rapid trend analysis for determining population morbidity statistics from data sets. Trend analysis statistics are automatically generated directly as documents are uploaded, or relevant data are indexed for later collation. Multiple occurrences of a value in a particular record or set of records are collected. For example, for a set of accounting records, this content trend analysis capability allows collection of all occurrences of individual accounts with past due billings past 90 days.

The KMS enables medical record examination studies to be done rapidly. With the KMS a user can look at values for population where the values (for example pulmonary artery pressure) have gotten better or worse over time where the population has been exposed to particular pharmaceutical agents. Additionally, this type of trend analysis may help determine the consistency of diagnoses in a target population. Trend analysis can be helpful in determination of cases of fraud.

The KMS allows a user to view a document using the KMS browser, or fetch the document in its original form by initiating the application that produces the document to be archived on the user/indexer's original system. If initiation of the document to be archived is in the original form, the KMS can upload the document to the target location where the document will be archived, and convert the format of the original document if necessary.

User/indexer's archival and indexing of a document is recorded as one or more entries in any of the multi-type indexes. In this way a history of the archived document accompanies the document. The number of times and the identity of the accessing user may be associated with a document as well.

The tracking performed and stored by a level of the document index provides a document access history that may accessed or displayed as part of overall document detail viewing. Document access history contains any activity, or activity attempted, relative to a document indicating what activity was performed (review, publish, edit, verify, copy), the activity's time, and user name. In this way, an "activity profile" match with user profiles can be generated to see what kind of users accomplish what kind of tasks and what usages and access statistics are associated with these tasks.

Persons skilled in the art will understand that the method described herein may be practiced including but not limited to the embodiments described. Further, it should be understood that the invention is not to be unduly limited to the foregoing which has been set forth for illustrative purposes. Various modifications and alternatives will be apparent to those skilled in the art without departing from the true scope of the invention, as defined in the following claims.

What is claimed is:

1. A computer-implementable document management method, comprising:
   uploading a plurality of documents to a database, wherein the uploaded documents are machine-readable and comprise one or more of text data, image data, video data, and audio data;
   assigning the uploaded documents to a hierarchical organizational structure within the database;
   indexing the uploaded documents to create a plurality of index fields for each of the uploaded documents;
   relating the index fields of the uploaded documents across the hierarchical organizational structure;
   receiving a search query having at least one search criterion for at least one of the index fields;
   searching the hierarchical organizational structure based on the search query;
   retrieving one or more of the uploaded documents across the hierarchical organizational structure of the database based on the search; and
   making one or more retrieved documents available to a user.

2. The method of claim 1, wherein the act of indexing the uploaded documents comprises creating at least one user-defined index field.

3. The method of claim 1, wherein the act of indexing the uploaded documents comprises creating at least one content index field having data contained in the uploaded document.

4. The method of claim 3, wherein the act of creating the at least one content index field having data contained in the uploaded document comprises capturing the data from the uploaded document to populate the at least one content index field when uploading the document.

5. The method of claim 4, wherein the act of capturing the data comprises receiving screen capture or document area highlighting from a user using a browser.

6. The method of claim 1, wherein the hierarchical organizational structure comprises a first level having a plurality of projects, a second level having a plurality of parent objects associated with the projects of the first level, and a third level having a plurality of child records associated with the parent objects of the second level.

7. The method of claim 6, wherein the parent objects represent an organizational level of the hierarchical organizational structure, and wherein the parent objects include subject information for linking to the uploaded documents and other information in the database associated with the parent object.

8. The method of claim 6, wherein the act of assigning the uploaded documents to the hierarchical organizational structure within the database comprises assigning one or more of the uploaded documents as one or more of the child records in the hierarchical organizational structure.

9. The method of claim 6, wherein the act of searching the database based on the search query further comprises:
associating the search query with one of the parent objects;
generating a search report based on the search query, and storing the search report as one of the child records for the parent object associated with the search query.

10. The method of claim 1, further comprising:
defining access restrictions for one or more users; and
restricting access by one of the users to the hierarchical organizational structure of the database based on the access restriction for the user.

11. The method of claim 10, wherein the act of restricting access includes restricting access by the user to information selected from the group consisting of an uploaded document, portion of an uploaded document, an index field, and a portion of an index field.

12. The method of claim 10, wherein the act of retrieving the one or more uploaded documents comprises redacting information from one of the uploaded documents retrieved for a user based on the access restriction defined for the user.

13. The method of claim 1, further comprising:
automatically issuing a notification for a user when a predefined action occurs with respect to an uploaded document.

14. The method of claim 13, wherein the predefined action for the notification is selected from the group consisting of an upload of a predefined document, a completion of indexing of a document, an availability of a document, and a current use of a document.

15. The method of claim 1, further comprising assigning tasks to be performed on document data as documents are uploaded to the database.

16. The method of claim 1, wherein the act of searching the hierarchical organizational structure based on the search query comprises searching the at least one index and one or more other indices related to the at least one index for the at least one search criterion.

17. The method of claim 1, further comprising receiving user selection of a data field within the uploaded documents, and determining a trend analysis for the selected data field.

18. A programmable storage device comprising machine-readable instructions stored thereon for causing a programmable control device to perform a method according to any one of claims 1 through 17.

19. A document management system, comprising:
a database configured with a hierarchical organizational structure,
a server communicatively connected to the database and configured to:
upload a plurality of documents to a database, wherein the documents are machine-readable and comprise one or more of text data, image data, video data, and audio data,
assign the uploaded documents to a hierarchical organizational structure within the database;
index the uploaded documents to create a plurality of index fields for each of the uploaded documents;
relate the index fields of the uploaded documents across the hierarchical organizational structure;
receive a search query having at least one search criterion for at least one of the index fields;
search the hierarchical organizational structure based on the search query;
retrieve one or more of the uploaded documents across the hierarchical organizational structure of the database based on the search; and
make the retrieved documents available to a user.

* * * * *